(12) United States Patent
Duncan et al.

(10) Patent No.: US 12,296,733 B2
(45) Date of Patent: May 13, 2025

(54) CLIMATE CONTROLLED SEAT

(71) Applicant: Lear Corporation, Southfield, MI (US)

(72) Inventors: Bradley Clifford Duncan, Harrison Township, MI (US); Vyachislav Ivanov, West Bloomfield, MI (US); Caleb Andrew Abbey, Warren, MI (US)

(73) Assignee: Lear Corporation, Southfield, MI (US)

( * ) Notice: Subject to any disclaimer, the term of this patent is extended or adjusted under 35 U.S.C. 154(b) by 214 days.

(21) Appl. No.: 18/140,029

(22) Filed: Apr. 27, 2023

(65) Prior Publication Data

US 2024/0359606 A1 Oct. 31, 2024

(51) Int. Cl.
*B60N 2/68* (2006.01)
*B60N 2/56* (2006.01)

(52) U.S. Cl.
CPC ................................ *B60N 2/5657* (2013.01)

(58) Field of Classification Search
CPC .. B60N 2/5642; B60N 2/5635; B60N 2/5657; B60N 2/565; B60N 2/5671; A47C 7/744; B60H 1/00285
See application file for complete search history.

(56) References Cited

U.S. PATENT DOCUMENTS

| | | | |
|---|---|---|---|
| 7,506,924 B2 | 3/2009 | Bargheer et al. | |
| 7,708,626 B2 | 5/2010 | Bargheer et al. | |
| 9,096,157 B2 | 8/2015 | Line et al. | |
| 9,744,888 B1 | 8/2017 | Hall et al. | |
| 9,854,915 B2 * | 1/2018 | Miron | B60N 2/5642 |
| 10,118,520 B2 * | 11/2018 | Craig | B60N 2/5635 |
| 10,322,653 B2 * | 6/2019 | Takazaki | B60H 1/0055 |
| 10,327,556 B2 * | 6/2019 | Miron | B60N 2/5642 |
| 10,793,038 B2 | 10/2020 | Chang et al. | |
| 11,065,991 B2 * | 7/2021 | Iacovone | B60N 2/5642 |
| 11,318,869 B2 * | 5/2022 | Greenwood | B60N 2/5657 |
| 2008/0290703 A1 | 11/2008 | Bargheer et al. | |
| 2015/0274049 A1 * | 10/2015 | Langensiepen | B60N 2/5635 297/180.12 |

FOREIGN PATENT DOCUMENTS

JP 2011031859 A 2/2011

* cited by examiner

*Primary Examiner* — Shin H Kim

(74) *Attorney, Agent, or Firm* — MacMillan, Sobanski & Todd, LLC

(57) ABSTRACT

A climate-controlled seat including a foam portion having a recess in a surface, an air channel extending through the foam and having a first opening configured to engage with a seat ventilation system and an opposed second opening adjacent to and operatively engaging the recess; a pair of gaskets located in the recess, adjacent to and on opposite sides of the second opening, the gaskets configured to block airflow from the second opening into the laterally extending recess; and a seat trim covering the foam portion over the surface and attached to the foam portion along the recess to provide a trench in the seat trim adjacent to the recess.

20 Claims, 6 Drawing Sheets

CLIMATE CONTROLLED SEAT

BACKGROUND OF THE INVENTION

This invention relates to a climate-controlled seat, which may be employed in a vehicle.

Climate controlled seats, for example vehicle seats, are known that provide heating, cooling and ventilation (HVAC) from the seat onto the seat occupant. Some of the climate-controlled seats direct airflow onto the seat occupant at various locations on the seat occupant's body. Airflow from the seat may not be optimally directed to provide the best effect at providing heating/cooling to the seat occupant. Such sub-optimally directed airflow may reduce the overall effectiveness of the climate control function on the seat occupant. It is desirable to provide a more effective means for providing thermal comfort to an occupant of a seat.

SUMMARY OF THE INVENTION

According to an aspect, an embodiment provides a climate-controlled seat for use by a seat occupant, the climate-controlled seat including: a foam portion having a laterally extending recess in a surface, an air channel extending through the foam and having a first opening configured to engage with a seat ventilation system and an opposed second opening adjacent to and operatively engaging the laterally extending recess; a pair of gaskets located in the laterally extending recess, adjacent to and on opposite sides of the second opening, the gaskets configured to block airflow from the second opening into the laterally extending recess; and a seat trim covering the foam portion over the surface and attached to the foam portion along the laterally extending recess to provide a laterally extending trench in the seat trim adjacent to the laterally extending recess.

According to an aspect, an embodiment provides a climate-controlled seat for use by a seat occupant including: a foam portion having a recess in a surface, an air channel extending through the foam and having a first opening configured to engage with a seat ventilation system and an opposed second opening adjacent to and operatively engaging the recess; a pair of gaskets located in the recess, adjacent to and on opposite sides of the second opening, the gaskets configured to block airflow from the second opening into the recess; and a seat trim covering the foam portion over the surface and attached to the foam portion along the recess to provide a parallel trench in the seat trim adjacent to the laterally extending recess.

According to an aspect, an embodiment provides a climate-controlled seat for use by a seat occupant including: a foam portion having a recess in a surface, an air channel extending through the foam and having a first opening configured to engage with a seat ventilation system and an opposed second opening adjacent to and operatively engaging the recess; a pair of gaskets located in the recess, adjacent to and on opposite sides of the second opening, the gaskets configured to block airflow from the second opening into the recess; a seat trim covering the foam portion over the surface and attached to the foam portion along the recess to provide a parallel trench in the seat trim adjacent to the recess; and a second air channel, forward of the air channel, extending through the foam and having a third opening configured to engage with the seat ventilation system and an opposed fourth opening adjacent to the surface, and louvers configured to direct the airflow onto a front of the seat occupant.

According to an aspect, an embodiment provides an improved heating/cooling performance of the climate-controlled seat on the seat occupant. Airflow from the climate-controlled seat directs airflow to provide improved heating/cooling sensation to the seat occupant. Blower output from an HVAC system is more directed to separate trim panels rather than dispersing from a trench in the climate-controlled seat. According to an aspect, an embodiment provides improved airflow for heating/cooling performance without adding additional separate parts to the climate-controlled seat.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
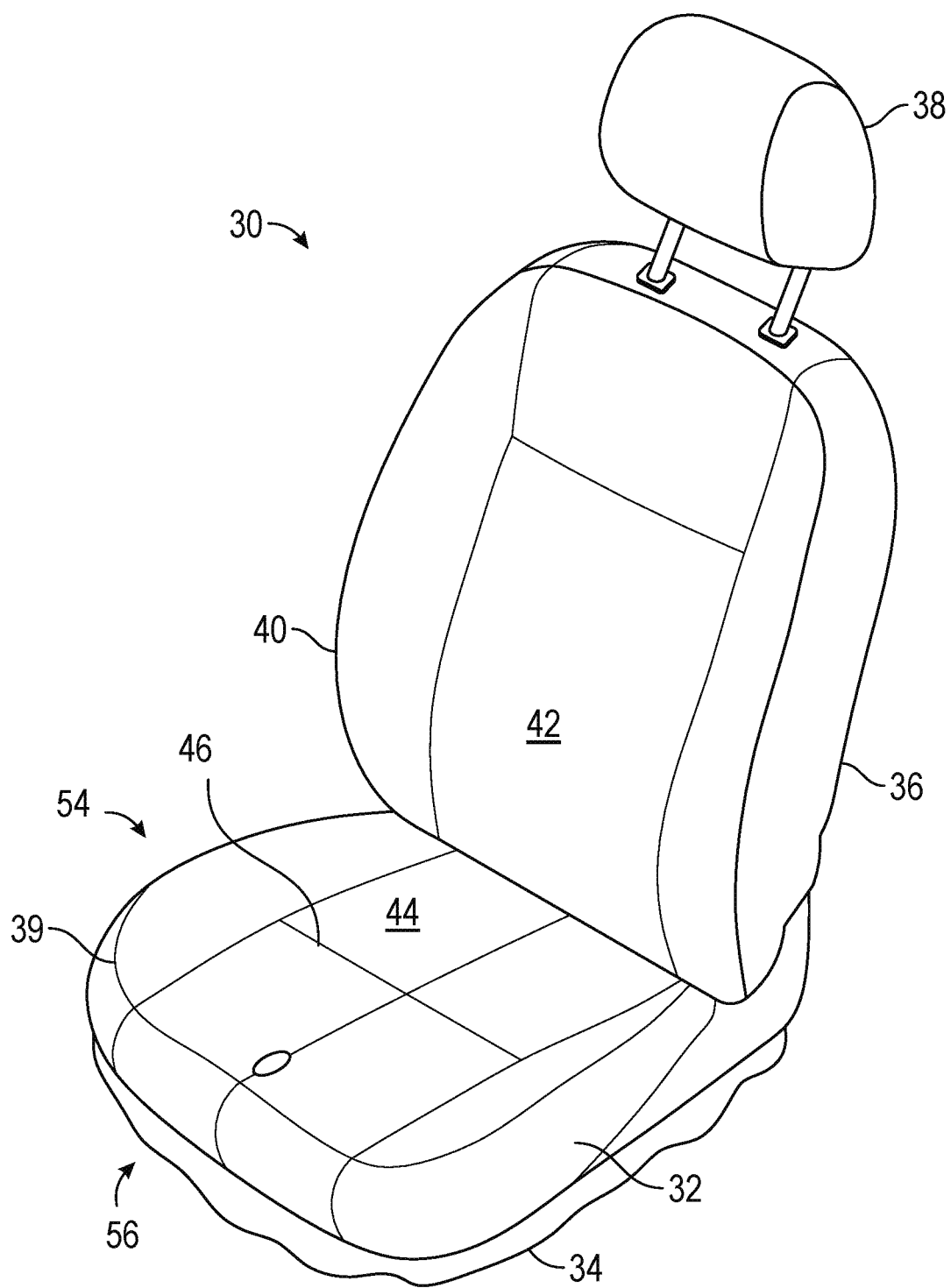
FIG. 1 is a schematic, perspective view of a climate-controlled seat.
Figure 2:
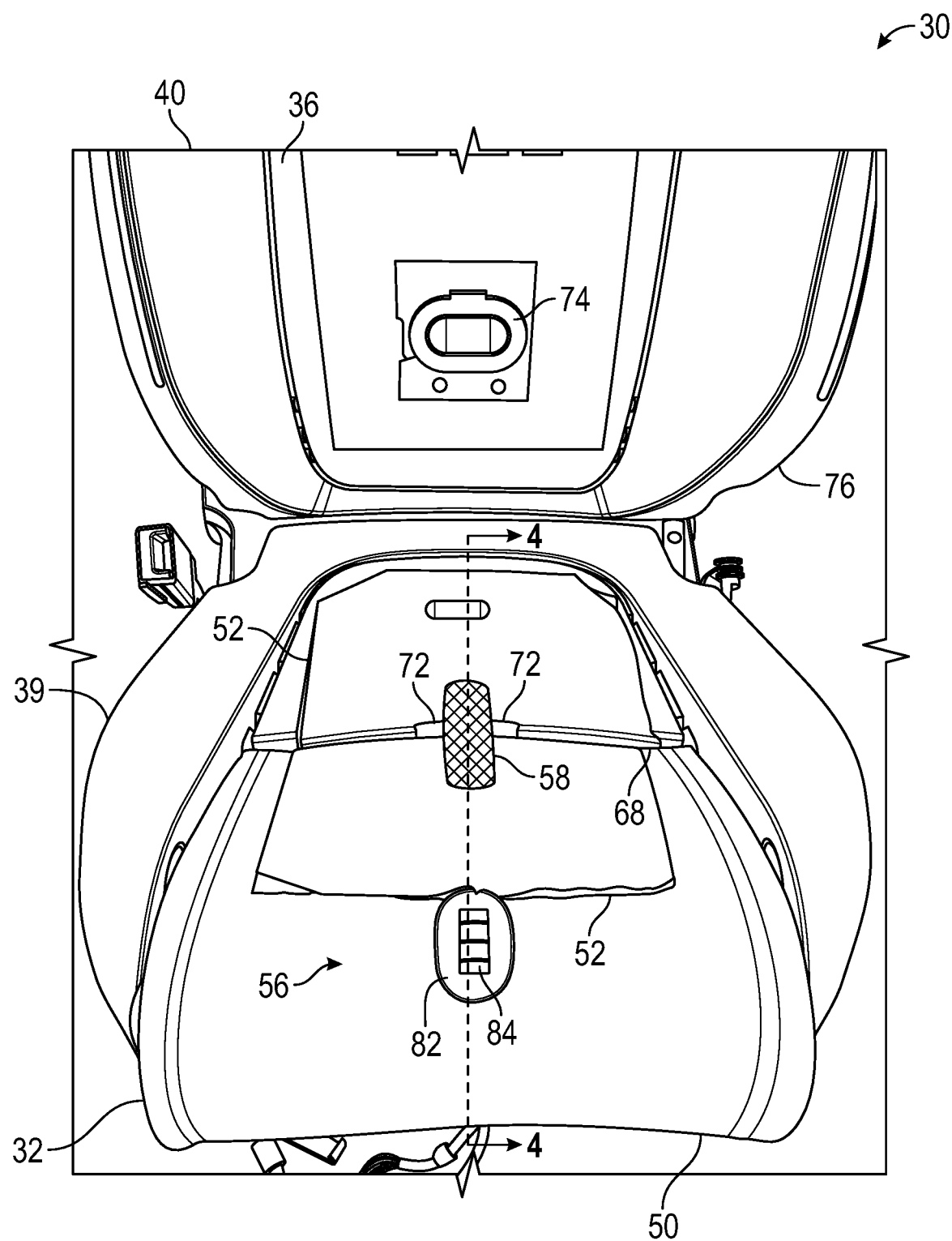
FIG. 2 is a schematic, front view of a portion of a seat.
Figure 3:
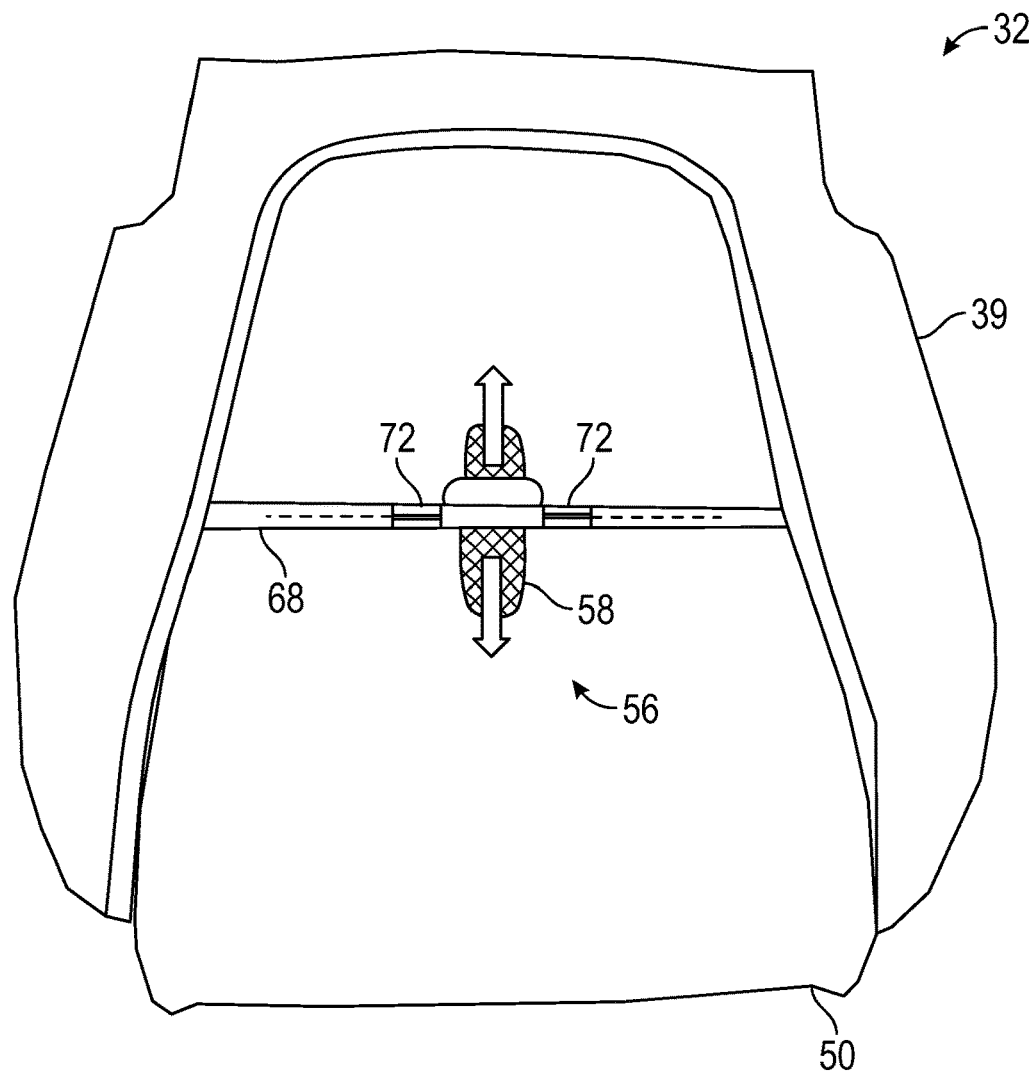
FIG. 3 is a schematic, front view of a portion of a seat.
Figure 4:
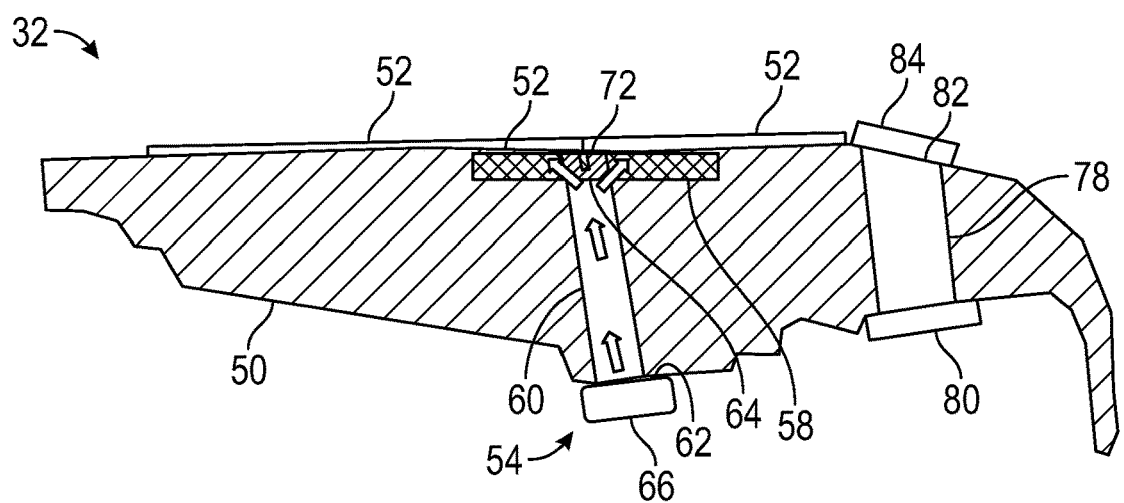
FIG. 4 is a schematic, cross section view of a portion of a seat, taken along line 4-4 in FIG. 2.
Figure 5:
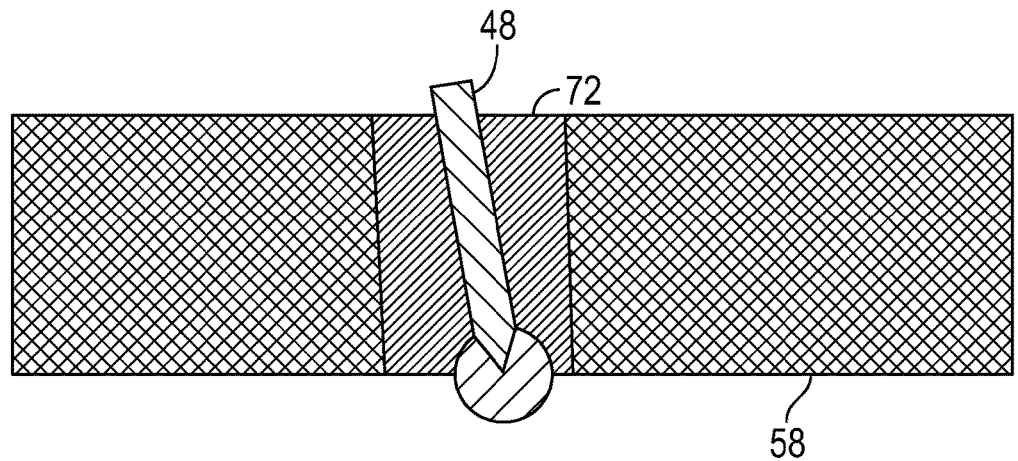
FIG. 5 is a schematic, side view of a portion of a seat.
Figure 6:
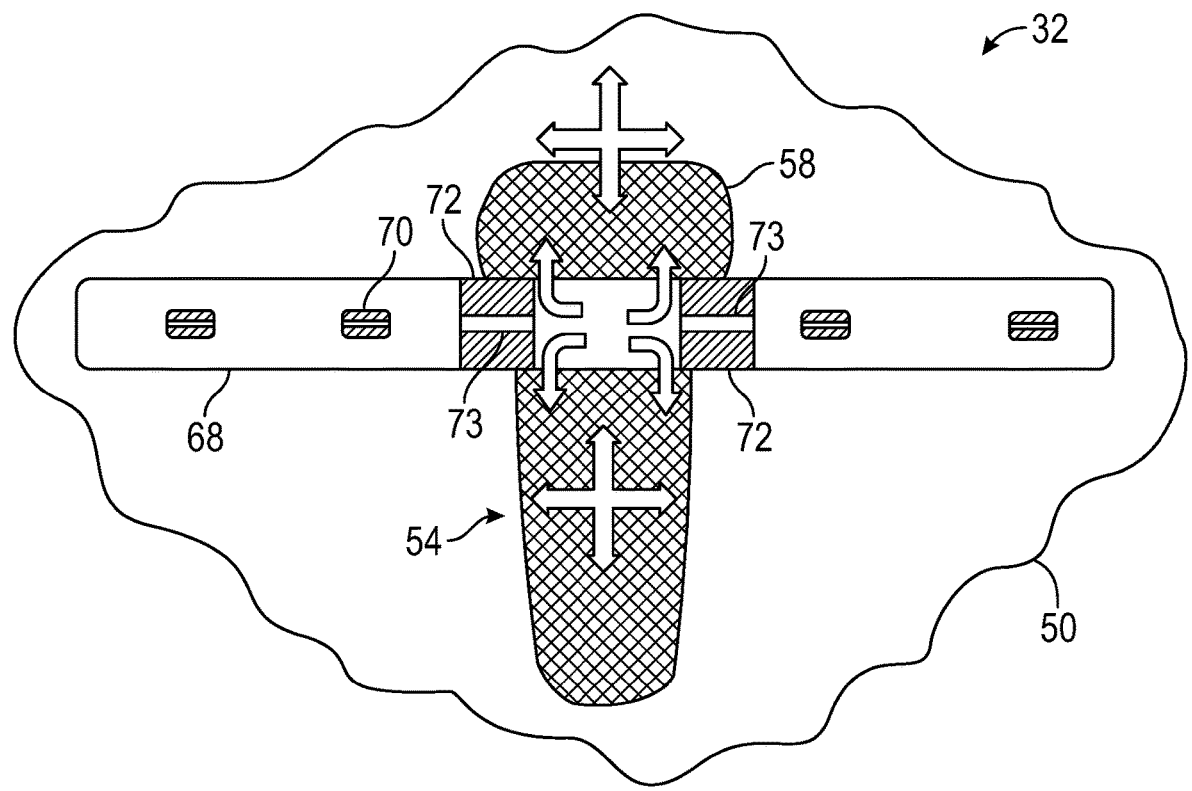
FIG. 6 is a schematic, top view of a portion of a seat.

Referring now to the example illustrated in FIG. 1, a portion of a vehicle seat 30, which is a climate-controlled seat, is shown. The vehicle seat 30 is contemplated to be employed in an automotive vehicle, although the vehicle seat 30 is contemplated to be employed in other types of vehicles. The vehicle seat 30 includes a seat bottom 32, which is mounted to vehicle structure 34, upon which a seat occupant sits. A seatback 36 is secured relative to the seat bottom 32 and supports the seat occupant's back. The vehicle seat 30 includes a headrest 38 mounted to and extending upward from the seatback 36. The terms front (forward), back (rear), up (top), down (bottom) and side (lateral) relate to a typical vehicle seat that faces forward in an automotive vehicle while in a position to allow a person (seat occupant) to sit on the vehicle seat 30. The seat bottom 32 has side bolsters 39 that provide side support to the seat occupant's thighs, and the seatback 36 has side bolsters 40 that provide side support to the seat occupants back. Seat trim (upholstery) 42 covers the seat bottom 32 and seatback 36. The seat trim 42 may have perforations or otherwise allow for distributed airflow onto, for example, the seat occupant's back, buttocks and under the seat occupant's thighs. The seat trim 42 is made of leather, cloth, or other suitable materials for covering the vehicle seat 30. A surface 44 of the seat trim 42 of the seat bottom 32 may also include a trench 46 where tie-downs 48 (see FIG. 5) are employed to secure the seat trim 42 to foam 50 (see FIGS. 2-4) of the seat bottom 32. The trench 46 may create a downward recess that extends below the height of the adjacent surface 44 of the seat trim 42. Accordingly, a bottom of a seat occupant's thighs may not contact the seat trim 42 in the trench 46 in the same way as contact with adjacent portions of the surface 44.

Referring now to the example illustrated in FIGS. 2-6, in view of FIG. 1, which illustrates a seat bottom portion 54 of a seat ventilation system 56, with portions of the seat bottom 32 illustrated without the seat trim 42. Air distribution members 52 (see FIGS. 2, 4 and 6) are illustrated mounted on top of the foam 50. The seat bottom foam 50 is formed with a recess in a top surface that receives a porous spacer material 58, which is adjacent to the air distribution members 52 mounted on top. An air channel 60, which may be generally vertical, extends through the foam 50 from a lower opening 62 adjacent to an underside of the foam 50 to an upper opening 64 adjacent to the spacer material 58. A blower 66 may operatively engage the lower opening 62 of the air channel 60 to create airflow, either heated, cooled or merely ventilation air, through the air channel 60. The blower 66 may be part of a heating, ventilation and air conditioning (HVAC) system associated with the vehicle seat 30. The blower 66 may direct airflow to other parts of the vehicle seat 30 or just to the seat bottom 32. Electrical power (not shown) may be provided to the blower 66 in a conventional way that electrical power is provided to various seat functions, which is known to those skilled in the art. The opening 64 of the air channel 60 and spacer material 58 are located so as to generally bisect the trench 46. In this way, a portion of airflow from the air channel 60 is directed to a portion of the spacer material 58 forward of the trench 46 and into a forward one of the air distribution members 52 and a portion of airflow from the air channel 60 is directed to a portion of the spacer material 58 rearward of the trench 46 and into a rearward one of the air distribution members 52.

In the example illustrated in FIGS. 1-6, the foam 50 includes a laterally extending recess 68, which is aligned with and adjacent to the trench 46. Wire tie-down attachments 70 are spaced along the lateral recess 68 and are configured to operatively engage with respective tie-downs 48 to secure the seat trim 42 to the foam 50. Since, as discussed above, the trench 46 is recessed downward from the surface 44 of the seat 30, contact with a seat occupant's thighs along this trench 46 is reduced. Thus, airflow through the seat trim 42 in the trench 46 may not be as effective at providing the heating/cooling affect as other parts of the seat bottom surface 44. A pair of gaskets 72 are located in the lateral recess 68, one on each side of the spacer material 58. The gaskets 72 may be located adjacent to opposed lateral sides of the spacer material 58, or the spacer material 58 may have opposed notches to receive at least a portion of the respective gaskets 72. The gaskets 72 are configured to block airflow from the upper opening 64 of the air channel 60 from flowing laterally (through the lateral recess 68) along the trench 46. The gaskets 72 may have small slits 73 for tie-downs. While the trench 46, the lateral recess 68 and the gaskets 72 are illustrated in the example relative to the seat bottom 32, such a configuration of elements may also be employed relative to the seatback 36.

The operation of the example illustrated in FIGS. 1-6 will now be discussed. Arrows in the figures schematically represent directions of airflow. The blower 66 is activated, causing airflow to be directed from the opening 62, through the air channel 60, to the opening 64, and into the spacer material 58. The spacer material 58, extending both forward of and rearward of the trench 46, directs the airflow into the air distribution members 52, both forward and rearward of the trench 46. The gaskets 72, being located in the trench 46 on opposite sides of the spacer material 58, essentially blocks airflow along the trench 46. Airflow through the air distribution members 52 flows through the seat trim 42 onto the seat occupant.

According to the example illustrated in FIGS. 1-6, the seat ventilation system 56 may include other portions that direct heated, cooled, ventilated, or any combination thereof, onto the seat occupant. A seatback duct 74 may direct airflow through seatback foam 76 and through seat trim 42 onto a back of a seat occupant. A second air channel 78 may connect at a lower end to a second blower 80 and connect to a duct opening 82 at an upper end, which may include louvers 84 that may be directionally adjustable. The duct opening 82 may direct airflow between thighs of the seat occupant toward a face of the seat occupant. Other systems for directing airflow from the seat onto the seat occupant may also be employed.

Figure 7:
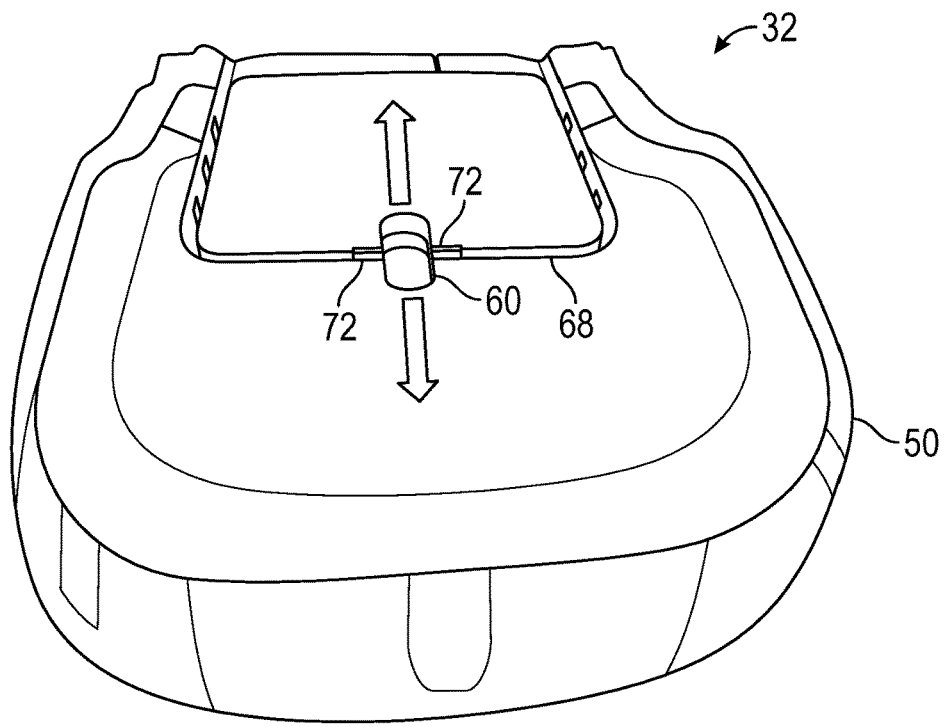
FIG. 7 is a schematic, front view of a portion of a seat.
Figure 8:
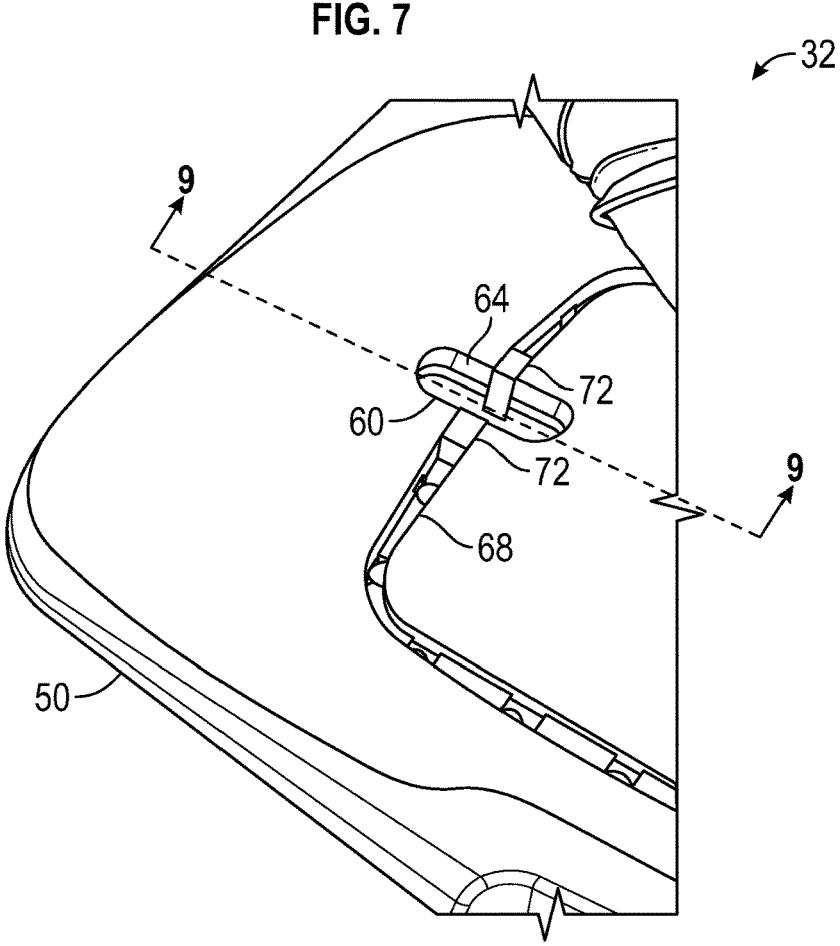
FIG. 8 is a schematic, perspective view of a portion of a seat.
Figure 9:
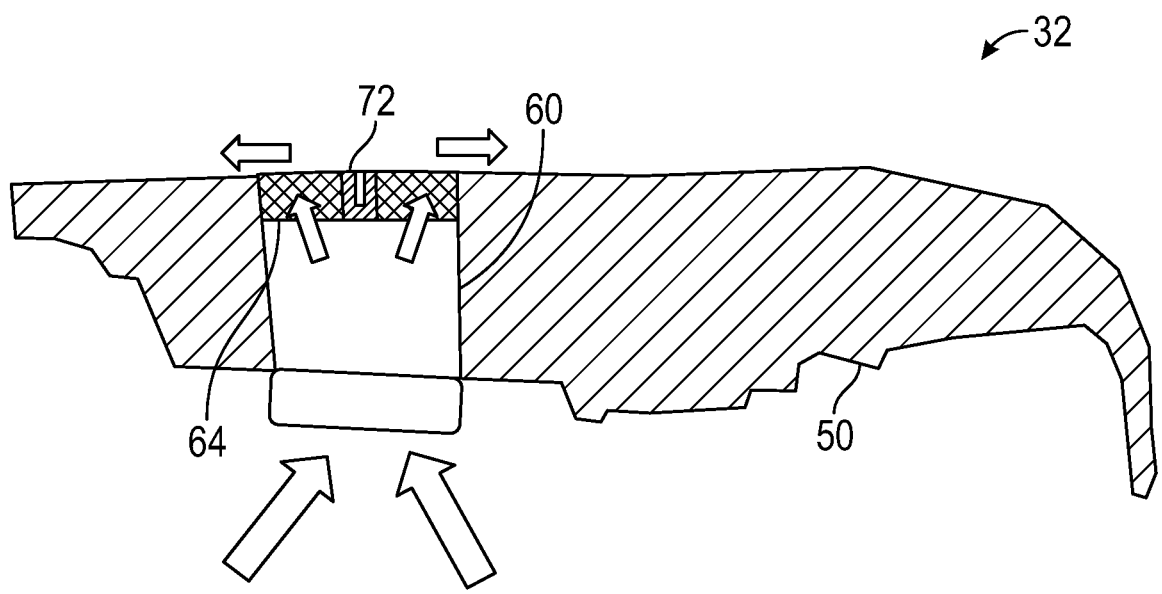
FIG. 9 is a schematic, cross section view of a portion of a seat, taken along line 9-9 in FIG. 8.

Referring now to the example illustrated in FIGS. 7-9, in view of FIG. 1, which illustrates a seat bottom foam 50 including an upper opening 64 from an air channel 60. The upper opening 64 is elongated in a forward-rearward direction to distribute airflow both forward of a lateral recess 68 and rearward of the lateral recess 68. A pair of gaskets 72 block airflow from the opening 64 from flowing into the lateral recess 68.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A climate-controlled seat for use by a seat occupant, the climate-controlled seat comprising:
    a foam portion having a laterally extending recess in a surface, an air channel extending through the foam and having a first opening configured to engage with a seat ventilation system and an opposed second opening adjacent to and operatively engaging the laterally extending recess;
    a pair of gaskets located in the laterally extending recess, adjacent to and on opposite sides of the second opening, the gaskets configured to block airflow from the second opening into the laterally extending recess; and
    a seat trim covering the foam portion over the surface and attached to the foam portion along the laterally extending recess to provide a laterally extending trench in the seat trim adjacent to the laterally extending recess.

2. The climate-controlled seat of claim 1 further comprising an air distribution member located between the foam portion and the seat trim, operatively engaging the second opening to receive the airflow therefrom, and configured to direct the airflow through the seat trim on a first side of the laterally extending recess.

3. The climate-controlled seat of claim 2 further comprising an air distribution member located between the foam portion and the seat trim, operatively engaging the second opening to receive the airflow therefrom, and configured to direct the airflow through the seat trim on an opposed second side of the laterally extending recess.

4. The climate-controlled seat of claim 1 further comprising a spacer material located between the second opening and the seat trim, the spacer material located in a portion of the lateral extending recess between the gaskets and configured to direct the airflow to the surface on a first side of the laterally extending recess.

5. The climate-controlled seat of claim 1 further comprising a spacer material located between the second opening and the seat trim, the spacer material located in a portion of the lateral extending recess between the gaskets and configured to direct the airflow to the surface on both sides of the laterally extending recess.

6. The climate-controlled seat of claim 5 further comprising an air distribution member located between the foam portion and the seat trim, operatively engaging the spacer material to receive the airflow therefrom and direct the airflow to the surface on both sides of the laterally extending recess.

7. The climate-controlled seat of claim 6 further comprising a second air channel, forward of the air channel, extending through the foam and having a third opening configured to engage with the seat ventilation system and an opposed fourth opening adjacent to the surface, and louvers configured to direct the airflow onto a front of the seat occupant.

8. The climate-controlled seat of claim 7 further comprising a blower operatively engaging at least one of the first opening and the third opening and configured to selectively provide the airflow through at least one of the air channel and the second air channel.

9. The climate-controlled seat of claim 1 further comprising a blower operatively engaging the first opening and configured to selectively provide the airflow through the air channel.

10. The climate-controlled seat of claim 1 further comprising a second air channel, forward of the air channel, extending through the foam and having a third opening configured to engage with the seat ventilation system and an opposed fourth opening adjacent to the surface, and louvers configured to direct the airflow onto a front of the seat occupant.

11. The climate-controlled seat of claim 10 wherein the foam portion is part of a seat bottom and the climate-controlled seat further comprises a seatback foam portion having a seatback duct through which the airflow is directed.

12. The climate-controlled seat of claim 1 wherein the foam portion is part of a seat bottom and the climate-controlled seat further comprises a seatback foam portion having a seatback duct through which the airflow is directed.

13. A climate-controlled seat for use by a seat occupant, the climate-controlled seat comprising:
   a foam portion having a recess in a surface, an air channel extending through the foam and having a first opening configured to engage with a seat ventilation system and an opposed second opening adjacent to and operatively engaging the recess;
   a pair of gaskets located in the recess, adjacent to and on opposite sides of the second opening, the gaskets configured to block airflow from the second opening into the recess; and
   a seat trim covering the foam portion over the surface and attached to the foam portion along the recess to provide a parallel trench in the seat trim adjacent to the recess.

14. The climate-controlled seat of claim 13 further comprising an air distribution member located between the foam portion and the seat trim, operatively engaging the second opening to receive the airflow therefrom, and configured to direct the airflow through the seat trim.

15. The climate-controlled seat of claim 13 further comprising a spacer material located between the second opening and the seat trim, the spacer material located in a portion of the recess between the gaskets and configured to direct the airflow to the surface on both sides of the recess.

16. The climate-controlled seat of claim 13 wherein the foam portion is part of a seat bottom and the climate-controlled seat further comprises a seatback foam portion having a seatback duct through which the airflow is directed.

17. The climate-controlled seat of claim 16 further comprising a second air channel, forward of the air channel, extending through the foam and having a third opening configured to engage with the seat ventilation system and an opposed fourth opening adjacent to the surface, and louvers configured to direct the airflow onto a front of the seat occupant.

18. The climate-controlled seat of claim 13 further comprising a blower operatively engaging the first opening and configured to selectively provide the airflow through the air channel.

19. A climate-controlled seat for use by a seat occupant, the climate-controlled seat comprising:
   a foam portion having a recess in a surface, an air channel extending through the foam and having a first opening configured to engage with a seat ventilation system and an opposed second opening adjacent to and operatively engaging the recess;
   a pair of gaskets located in the recess, adjacent to and on opposite sides of the second opening, the gaskets configured to block airflow from the second opening into the recess;
   a seat trim covering the foam portion over the surface and attached to the foam portion along the recess to provide a parallel trench in the seat trim adjacent to the recess; and
   a second air channel, forward of the air channel, extending through the foam and having a third opening configured to engage with the seat ventilation system and an opposed fourth opening adjacent to the surface, and louvers configured to direct the airflow onto a front of the seat occupant.

20. The climate-controlled seat of claim 19 further comprising a spacer material located between the second opening and the seat trim, the spacer material located in a portion of the recess between the gaskets and configured to direct the airflow to the surface on both sides of the recess.

* * * * *